(12) United States Patent
Naito

(10) Patent No.: US 10,603,631 B2
(45) Date of Patent: Mar. 31, 2020

(54) DESULFURIZATION APPARATUS AND EXHAUST GAS PROCESSING SYSTEM USING THE SAME

(71) Applicant: IHI Corporation, Koto-ku (JP)

(72) Inventor: Toshiyuki Naito, Tokyo (JP)

(73) Assignee: IHI Corporation, Koto-ku (JP)

(*) Notice: Subject to any disclaimer, the term of this patent is extended or adjusted under 35 U.S.C. 154(b) by 15 days.

(21) Appl. No.: 15/225,059

(22) Filed: Aug. 1, 2016

(65) Prior Publication Data

US 2016/0339383 A1 Nov. 24, 2016

Related U.S. Application Data

(63) Continuation of application No. PCT/JP2015/058873, filed on Mar. 24, 2015.

(30) Foreign Application Priority Data

Apr. 15, 2014 (JP) ................................ 2014-083481

(51) Int. Cl.
 *B01D 53/50* (2006.01)
 *B01D 53/75* (2006.01)
 (Continued)

(52) U.S. Cl.
 CPC ......... *B01D 53/502* (2013.01); *B01D 21/262* (2013.01); *B01D 53/75* (2013.01);
 (Continued)

(58) Field of Classification Search
 CPC .................................................... B01D 53/50
 See application file for complete search history.

(56) References Cited

U.S. PATENT DOCUMENTS 5,486,341 A * 1/1996 Bresowar ............... B01D 45/08
 423/242.1
5,743,929 A * 4/1998 Kapoor ................ B01D 53/501
 65/134.6
(Continued)

FOREIGN PATENT DOCUMENTS

CN 1745881 A * 3/2006
GB 2 162 162 A 1/1986
(Continued)

OTHER PUBLICATIONS

Japanese Office Action dated Aug. 29, 2017 in Patent Application No. 2016-513689 (without English Translation).
(Continued)

*Primary Examiner* — Matthew D Krcha
(74) *Attorney, Agent, or Firm* — Oblon, McClelland, Maier & Neustadt, L.L.P.

(57) ABSTRACT

A desulfurization apparatus employing the limestone-gypsum method has: a desulfurization unit where an absorbing liquid containing a calcium compound contacts with an exhaust gas to remove a sulfur oxide from the exhaust gas; a removal unit for removing gypsum, generated from the sulfur oxide, from the absorbing liquid; and a cleaning unit for cleaning the exhaust gas after contacting, using a cleaning liquid, thereby removing calcium-containing particles from the exhaust gas. In the removal unit, the gypsum is separated into larger gypsum particles and smaller gypsum particles using a cyclone separator, and the absorbing liquid containing the larger gypsum particles is filtrated and the filtrate is supplied to the cleaning unit as the cleaning liquid. An exhaust gas processing system has the desulfurization apparatus, a denitration apparatus and a carbon dioxide recovery apparatus. A post-recovery gas is partially supplied to the desulfurization apparatus as an oxygen source.

8 Claims, 2 Drawing Sheets

(51) Int. Cl.
*B01D 53/78* (2006.01)
*C01B 32/50* (2017.01)
*B01D 21/26* (2006.01)
*B01D 53/62* (2006.01)
*B01D 53/56* (2006.01)
*B01D 45/04* (2006.01)

(52) U.S. Cl.
CPC .............. *B01D 53/78* (2013.01); *C01B 32/50* (2017.08); *B01D 21/267* (2013.01); *B01D 45/04* (2013.01); *B01D 53/56* (2013.01); *B01D 53/62* (2013.01); *B01D 2251/404* (2013.01); *Y02P 20/152* (2015.11); *Y02P 70/34* (2015.11)

(56) References Cited

U.S. PATENT DOCUMENTS

| | | | | |
|---|---|---|---|---|
| 5,928,413 | A | * | 7/1999 | Ochi ................... B01D 53/501 95/177 |
| 6,068,822 | A | * | 5/2000 | Kotake ................ B01D 53/504 423/220 |
| 2007/0217981 | A1 | * | 9/2007 | Van Essendelft .. B01D 53/1475 423/220 |
| 2008/0038173 | A1 | * | 2/2008 | Bradburn ............... B01D 53/73 423/215.5 |
| 2012/0128540 | A1 | | 5/2012 | Shijo et al. |
| 2013/0319040 | A1 | | 12/2013 | Naito |

FOREIGN PATENT DOCUMENTS

| | | |
|---|---|---|
| JP | 60-67130 U | 5/1985 |
| JP | 61-35827 | 2/1986 |
| JP | 61-259730 A | 11/1986 |
| JP | 6-63353 A | 3/1994 |
| JP | 6-114232 A | 4/1994 |
| JP | 7-16430 | 1/1995 |
| JP | 7-9427 A | 2/1995 |
| JP | 7-178315 | 7/1995 |
| JP | 7-330397 | 12/1995 |
| JP | 9-141050 | 6/1997 |
| JP | 10-128055 A | 5/1998 |
| JP | 10-216474 | 8/1998 |
| JP | 11-5014 | 1/1999 |
| JP | 2001-25626 | 1/2001 |
| JP | 3925244 | 6/2007 |
| JP | 2009-97507 | 5/2009 |
| JP | 2011-50941 | 3/2011 |
| JP | 2011-125766 | 6/2011 |
| JP | 2012-50931 | 3/2012 |
| JP | 2012-106163 | 6/2012 |
| WO | WO 2012/107953 A1 | 8/2012 |

OTHER PUBLICATIONS

International Search Report dated May 26, 2015 in PCT/JP2015/058873 filed on Mar. 24, 2015 (with English translation).
Written Opinion dated May 26, 2015 in PCT/JP2015/058873 filed on Mar. 24, 2015.

* cited by examiner

DESULFURIZATION APPARATUS AND EXHAUST GAS PROCESSING SYSTEM USING THE SAME

CROSS REFERENCE TO RELATED APPLICATIONS

This application is a continuation application of International Application No. PCT/JP2015/058873, filed on Mar. 24, 2015, which claims priority of Japanese Patent Application No. 2014-083481, filed on Apr. 15, 2014, the entire contents of which are incorporated by reference herein.

BACKGROUND

Technical Field

Embodiments described herein relates to a desulfurization apparatus for removing a sulfur oxide from an exhaust gas containing carbon dioxide, such as combustion gas, and to an exhaust gas processing system which employs the same and removes a sulfur oxide, a nitrogen oxide and the like so that can separate and recover carbon dioxide.

Description of the Related Art

In thermal power stations, ironworks, boilers and other facilities, fuels such as coal, heavy oil and extra heavy oil are used in a large quantity. For sulfur oxides, nitrogen oxides, and carbon dioxide discharged by the burning of the fuel, quantitative and concentration limitations regarding emission are needed from the view point of prevention of air pollution and conservation of global environment. In recent years, carbon dioxide has been regarded as a problem as it is the main cause of global warming, so that a movement of suppressing the emissions thereof in the world has been becoming activated. Thus, various researches have been actively promoted for making it possible to recover and store the carbon dioxide from combustion exhaust gas or process exhaust gas without discharging carbon dioxide into the atmosphere. Combustion exhaust gas contains not only carbon dioxide and water but also nitrogen oxides, sulfur oxides, mercury, hydrogen chloride, ash dusts (particulate matters) and the like as minor components. It is therefore important from the viewpoint of environmental conservation to decrease the quantity of impurities contained in the carbon dioxide recovered from the exhaust gas to increase the purity of carbon dioxide.

Of the nitrogen oxides contained in combustion exhaust gas, nitrogen dioxide is removable by a wet absorption processing using an alkaline agent. However, nitrogen monoxide is poorly soluble in water. Thus, many of ordinarily performed denitration techniques are based on a dry-type ammonia catalytic reduction method, and nitrogen oxides are reduced by catalytic reaction by supplying ammonia or some other hydrogen source. When a desulfurization and denitration apparatus is formed-on the basis of such a technique, in its desulfurization unit, sulfur oxides in an exhaust gas are processed in the state of ammonium salts.

In the meantime, about the desulfurization methods, various wet or dry processing techniques have been researched for removing sulfur oxides, using an alkaline desulfurizing agent. For example, Publication Document 1 listed below describes an exhaust gas wet processing method of bringing the exhaust gas and slurry containing a desulfurizing agent into liquid-gas contact with each other, in which carbon dioxide is recovered by desulfurization of the exhaust gas. Examples of the alkaline agent usable in such a desulfurization method include sodium hydroxide (or sodium carbonate), limestone (or slaked lime or dolomite), and magnesium hydroxide. Although sodium hydroxide is very high in efficiency of removing the sulfur oxides, it is expensive to increase costs for the processing. It is therefore general in large-sized plants such as thermal power stations to employ the limestone-gypsum method that inexpensive limestone (calcium carbonate) or slaked lime (calcium hydroxide) is used.

As a method in which a hydrogen source or a desulfurizing agent as described above is not used, suggested is a method of pressurizing the exhaust gas, and then cooling it to condense the water content in the exhaust gas (see Publication Document 2 listed below). In this method, sulfur oxides and nitrogen oxides contained in the pressurized exhaust gas are dissolved in the condensed water, and denitration and desulfurization of the exhaust gas are performed by separating the condensed water from the exhaust gas.

DOCUMENTS LIST

Publication Document 1: Japanese Unexamined Patent Application Publication (JP-A) No. 2012-106163

Publication Document 2: PCT International Publication pamphlet of WO 2012/107953

BRIEF SUMMARY

In regard to the denitration method, the reduction method using hydrogen source such as ammonia is difficult in reduction of processing costs, and it is desirable that nitrogen oxides can be processed without use of such resources. On the other hand, in the technique of the above Publication Document 2, sulfur oxides and nitrogen oxides are removed together with condensed water by pressurizing and cooling the exhaust gas. Thus this technique does not require any chemical agent such as the desulfurizing agent, etc. However, acids (sulfuric acid and sulfurous acid) generated from the sulfur oxides easily damage the compressor and other equipment. Accordingly, if this technique is used singly to attain desulfurization and denitration, a large burden is imposed onto the apparatus to cause a problem about costs for maintaining the facilities. It is also difficult to attain the desulfurization and the denitration with a high removing efficiency. In connection with this point, since the desulfurization method according to the limestone-gypsum method makes use of relatively inexpensive limestone as an absorbent, it is a profitable desulfurization method for processing costs and is thus favorable for economy.

However, in the desulfurization method according to the limestone-gypsum method, when a slurry in which an absorbent is dispersed in water is used as an absorbing liquid to capture sulfur oxides in the exhaust gas, the absorbing liquid is deprived of water content if the slurry contacts the exhaust gas with a high temperature that is introduced from a combustion system, so that fine solid particles are scattered and easily entrained in the exhaust gas. Such scattered particles easily cause a failure of wear and breakdown in the subsequent machinery. Therefore, the scattered particles must be removed from the exhaust gas. If a filtrating member such as a filter bag or the like is used to separate the scattered particles from the exhaust gas, ventilation resistance of the exhaust gas becomes very large so that energy and power device becomes necessary for urging the gas flow. Accordingly, when the desulfurization method according to the limestone-gypsum method is used in the exhaust gas processing process, it is also important to devise so as to address the problem of scattered particles as described above.

Moreover, economic efficiency is important for spreading the processing of exhaust gas, and it is important to improve the economics for each of the processing techniques implemented in the process, in order to increase the economic efficiency in the whole process of processing the exhaust gas. The main component of the exhaust gas after subjected to desulfurization and denitration treatment is carbon dioxide, and it is stored in the ground in the present circumstances. However, the economic efficiency may be enhanced if effective use of the recovered carbon dioxide is realized. Carbon dioxide recovered from the exhaust gas after the desulfurization and denitration contains small amounts of argon, oxygen, nitrogen and the like. If efficient recovery of high purity carbon dioxide is possible, its provision to the market as a product such as liquefied carbon dioxide also becomes possible, which is useful on the industry. At that time, recovery efficiency of high purity carbon dioxide is important in order to be economically profitable technique. When using the desulfurization method according to the limestone-gypsum method in a system that performs such advanced exhaust gas processing, the above-mentioned scattered particles are likely to cause a more serious obstacle in the processing apparatus. Therefore, it is important to cope with the scattered particles.

An object of the present disclosure is to solve the above-mentioned problems and provide a desulfurization apparatus that is excellent in economic efficiency and can eliminate the failure to the subsequent equipment due to the scattered particles, and that is suitably applicable to the exhaust gas processing system capable of recovering carbon dioxide with high purity, with use of desulfurization technique according to the limestone-gypsum method.

Another object of the present disclosure is to provide an exhaust gas processing system excellent in economy, with less damage and troubles of the equipment when processing the exhaust gas, which enables to attain the desulfurization and denitration of the exhaust gas efficiently to recover carbon dioxide with high purity and which makes possible to decrease the energy necessary for the processing.

In order to solve the above-mentioned problems, the inventors have conducted eager researches to find out that the problem of scattered particles in the desulfurization apparatus according to the limestone-gypsum method is possibly solved by a simple configuration and that the desulfurization processing can be carried out suitably, and then achieved the present technology. Moreover, it has also achieved to effectively implement the processing of the exhaust gas while using energy efficiently, by combining the exhaust gas processing using the pressurization and cooling that efficient recovering of high purity carbon dioxide is possible, with the desulfurization treatment according to the limestone-gypsum method.

According to an aspect of the present disclosure, the desulfurization apparatus is a desulfurization apparatus that removes a sulfur oxide from an exhaust gas by the limestone-gypsum method, and its subject comprises: a desulfurization unit that brings an absorbing liquid containing a calcium compound into contact with the exhaust gas to remove the sulfur oxide from the exhaust gas; a removal unit that removes gypsum produced from the calcium compound and the sulfur oxide, from the absorbing liquid by classification and filtration; and a cleaning unit that cleans the exhaust gas having passed through the contact with the absorbing liquid in the desulfurization unit, with using as a cleaning liquid the absorbing liquid from which the gypsum is removed by the removal unit, to remove calcium-containing particles contained in the exhaust gas, wherein the removal unit has a cyclone separator to classify the gypsum, and a filter for filtering off the gypsum from the absorbing liquid, the cyclone separator classifies the absorbing liquid having the produced gypsum into a first fraction containing the gypsum of relatively large particles and a second fraction containing the gypsum of relatively small particles, and the filter filters off the gypsum from the first fraction to supply the filtered absorbing liquid to the cleaning unit.

Moreover, according to an aspect of the present disclosure, an exhaust gas processing system comprises: the desulfurization apparatus as described above; a denitration apparatus arranged in a subsequent stage from the desulfurization apparatus, to remove a nitrogen oxide from the exhaust gas; a carbon dioxide recovery apparatus arranged in a subsequent stage from the denitration unit, to recover carbon dioxide from the exhaust gas; and an oxygen supply unit that supplies a faction of a post-recovery gas discharged from the carbon dioxide recovery apparatus, as an oxygen source, to the desulfurization apparatus.

According to the present disclosure, since the problem of scattered particles in the desulfurization processing according to the limestone-gypsum method can be eliminated by a simple technique, previous cooling of the exhaust gas is unnecessary and it also contributes to a decrease in operating costs for the desulfurization processing of the exhaust gas and the overall exhaust gas processing using the same to improve economic efficiency.

BRIEF DESCRIPTION OF DRAWINGS

The features and merits of the desulfurization apparatus and the exhaust gas processing system according to the present disclosure will more clearly understood from the following description of the conjunction with the accompanying drawings in which identical reference letters designate the same or similar elements or cases throughout the figures and in which.

DETAILED DESCRIPTION OF EMBODIMENTS

Figure 1:
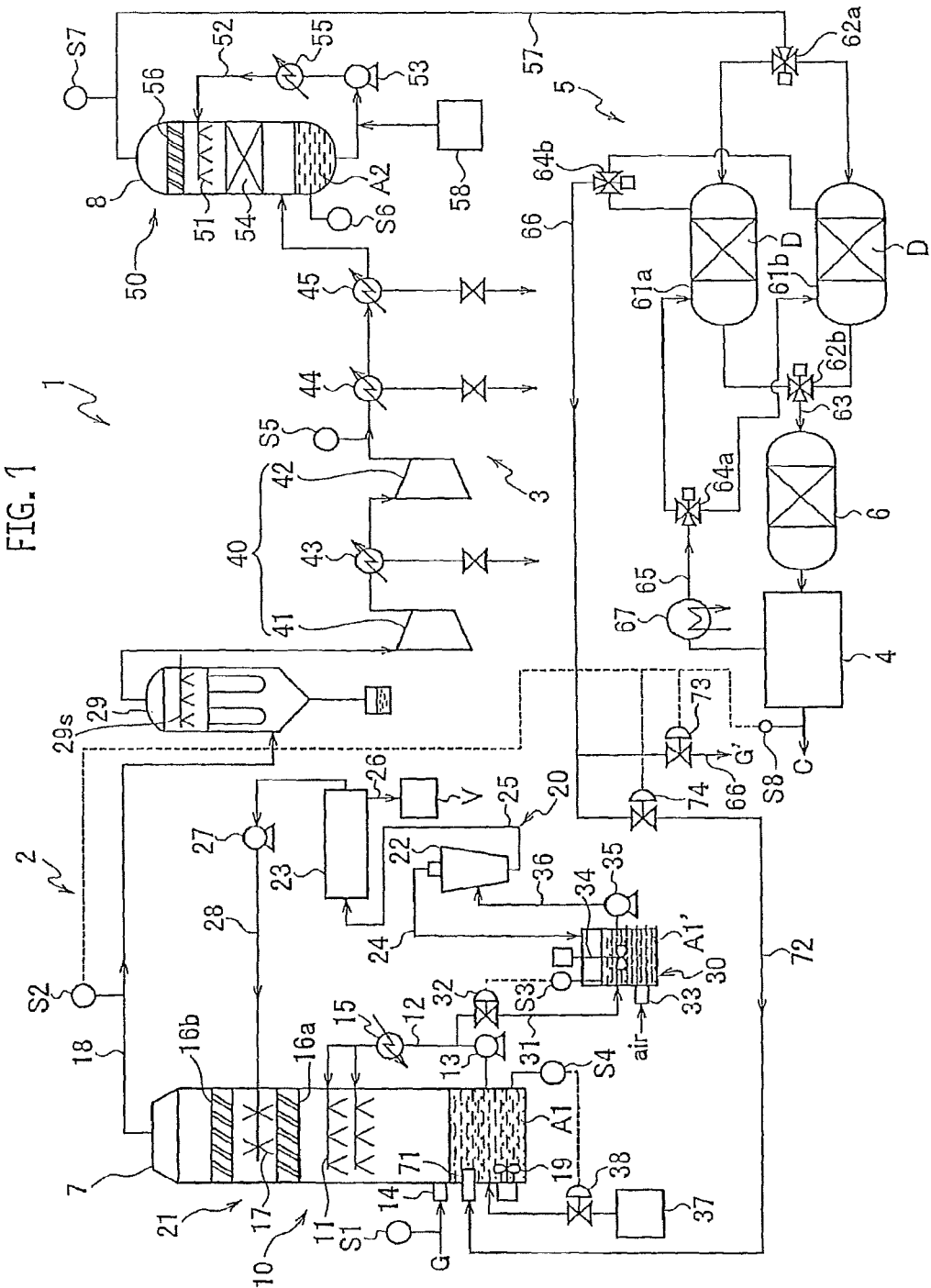
FIG. 1 is a schematic structural view illustrating an embodiment of the exhaust gas processing system including the desulfurization apparatus according to the present disclosure.

Main components of the exhaust gas such as combustion gas and the like are water and carbon dioxide, and it further contains, as impurities, sulfur oxides, nitrogen oxides, hydrogen chloride, oxygen, mercury, soot and dust (particulate matters) and the like in a small proportion. The sulfur oxides are derived from the fuel, and the nitrogen oxides are mainly derived from nitrogen in the air. The amount of oxygen remaining in the exhaust gas is varied in accordance with the combustion conditions. In the case of oxygen combustion exhaust gas with increased combustion efficiency using oxygen, the oxygen content may be approximated at about 5% and the balance contains water of about 20% and carbon dioxide of about 75%. However, it is similar in terms of further containing the above-mentioned impurities. The sulfur oxides (SOx) include sulfur dioxide, sulfur trioxide and so on, and the main part is present as sulfur dioxide in the exhaust gas. These oxides are each soluble in water to make sulfurous acid or sulfuric acid. The nitrogen oxides (NOx) include several types including nitrogen monoxide and nitrogen dioxide, and they are mainly present as nitrogen monoxide or nitrogen dioxide. Nitrogen dioxide dissolves in water, but nitrogen monoxide is insoluble in water. Therefore, oxidation of nitrogen oxides is necessary in performing the denitration with use of water. In this regard, if pressure is applied to the exhaust gas, oxidation reaction proceeds to convert nitrogen monoxide to nitrogen dioxide by the oxygen remaining in the exhaust gas, which allows the removal processing with water. However, in regard to the sulfur oxides, since sulfuric acid occurs from water vapor and sulfur trioxide produced by the oxidation reaction, it is to corrode the metal and susceptible to damage the compressor, etc. But in the case of the exhaust gas which has been subjected to desulfurization processing in advance, corrosion by sulfuric acid can be avoided even under pressure. Thus it is possible to perform the desulfurization and the denitration inexpensively and safely by sequentially applying the desulfurization processing according to the limestone-gypsum method, the oxidation reaction by pressurizing, and a wet denitration processing to the exhaust gas, and removal performance of impurities also increases. However, the desulfurization processing according to the limestone-gypsum method has a problem of scattered particles generated in contact with high temperature exhaust gas, which causes the fault to the subsequent equipment. Therefore, such a configuration to pressurize the exhaust gas directly after the desulfurization is undesirable.

In the present disclosure, to solve this problem, a cleaning unit for removing the scattered particles is provided in the desulfurization apparatus, thereby constituting the desulfurization apparatus so as to use the absorbing liquid after removal of the gypsum produced by the desulfurization, as a cleaning liquid in the unit. Accordingly, in the exhaust gas processing system into which the desulfurization apparatus according to the limestone-gypsum method is incorporated, it is possible to prevent a failure from occurring due to the scattered particles even when pressurization equipment such as a compressor is subsequently arranged. The cleaning unit is disposed in the desulfurization column together with the desulfurization unit and is configured in a simple structure capable of collecting the scattered particles without increasing the flow resistance of the exhaust gas. Therefore, it is possible to reduce the consumption of power. Since it is possible to apply pressure to the exhaust gas after the desulfurization, oxidation reaction is allowed to proceed by oxygen remaining in the exhaust gas to convert the nitrogen monoxide to nitrogen dioxide and it becomes possible to perform wet denitration processing using washing water. The sulfur oxides easily occurs damage to the compressor, etc. because sulfur trioxide caused by the oxidation reaction and water vapor produces sulfuric acid that causes to corrode the metal. However, since the exhaust gas is previously subjected to the desulfurization processing, it is possible to avoid the corrosion by sulfuric acid even equipped with the pressurization equipment. Therefore, it is possible to remove nitrogen oxides economically, by combining the oxidation of nitrogen monoxide using the progress of the oxidation reaction by pressurization, with the wet denitration processing. It is thus very profitable in comparison with the case of using the denitration processing according to the reduction method. As a result, such an exhaust gas processing system can be constructed that the desulfurization processing according to the limestone-gypsum method, the oxidation reaction by the pressuring, and the wet denitration processing are sequentially applied to the exhaust gas and that is capable of performing the desulfurization and the denitration inexpensively and safely.

With respect to the configuration of the above-described exhaust gas processing system, a post-recovery gas discharged as purification residue after the recovery of carbon dioxide from the exhaust gas contains oxygen. Therefore, this post-recovery gas can be used as an oxygen source for oxidizing sulfite ions produced in the desulfurization processing from sulfur dioxide of the exhaust gas. Since the main component of the post-recovery gas is carbon dioxide, the carbon dioxide in the post-recovery gas is recovered again according to the configuration of the system which is made in such a manner that the post-recovery gas after passing through the oxidation of sulfite ions in the absorbing liquid is allowed to go again through the processing process. Therefore, it is favorable for the purification efficiency of the carbon dioxide. The post-recovery gas is used not wholly but partially, so as to avoid extreme increase in the concentration of impurities (argon, nitrogen, etc.) other than oxygen due to enrichment thereof in the exhaust gas after subjected to the process of the desulfurization and the denitration.

That is, the desulfurization apparatus according to the present disclosure is a desulfurization apparatus which removes a sulfur oxide from an exhaust gas according to the limestone-gypsum method, and it comprises a desulfurization unit that brings an absorbing liquid containing a calcium compound into contact with the exhaust gas to remove the sulfur oxide from the exhaust gas, a removal unit that removes gypsum produced from the calcium compound and the sulfur oxide, from the absorbing liquid by classification and filtration, and a cleaning unit that cleans the exhaust gas having passed through the contact with the absorbing liquid in the desulfurization unit, with using as a cleaning liquid the absorbing liquid from which the gypsum is removed by the removal unit, to remove calcium-containing particles contained in the exhaust gas. The removal unit has a cyclone separator to classify the gypsum, thereby relatively classifying the gypsum particles into large gypsum particles and small gypsum particles. The filtering separation is performed with respect to only the absorbing liquid containing relatively large gypsum particles to utilize the absorbing liquid obtained as the filtrate for a cleaning liquid in the cleaning unit, and the relatively small gypsum particles are not subjected to the filtering separation. Consequently, filtration efficiency increases and the absorbing liquid from which the gypsum has been removed can be stably and continuously supplied as a cleaning liquid. Together with the above, small gypsum particles are prevented from remaining in the absorbing liquid after the filtration, and it is possible to suppress the cause of the scattered particles when supplied to the cleaning unit as the cleaning liquid.

The removal unit described above is profitable in filtration efficiency. As the filter, it is possible to use a belt filter which filters the absorbing liquid under reduced pressure.

The cleaning unit can be configured to have a pair of mist removal members arranged so that the exhaust gas which has passed through the desulfurization unit sequentially passes therethrough, and a cleaning nozzle which supplies the cleaning liquid to the exhaust gas between the pair of the mist removal members. Each of the mist removal members can be constituted by a plurality of oblique plates arranged in parallel with providing gaps inclined with respect to passage direction of the exhaust gas.

The desulfurization apparatus can be configured to further comprise, between the desulfurization unit and the removal unit, an oxidizing tank which supplies an oxygen source to the absorbing liquid which has passed through the contact with the exhaust gas in the desulfurization unit, to perform oxidation, wherein the absorbing liquid that has been subjected to the oxidation at the oxidizing tank is supplied to the removal unit. Moreover, such a configuration is possible to further comprise: an analyzer which measures pH of the absorbing liquid which has passed through the contact with the exhaust gas in the desulfurization unit; and a replenishing unit which replenishes the calcium compound to the absorbing liquid in the desulfurization unit in accordance with the measurement of the analyzer.

Air can be used as the oxygen source supplied to the oxidizing tank, and the cyclone separator can be configured to return the second fraction to the oxidizing tank.

Hereinafter, embodiments of the exhaust gas processing system including the desulfurization apparatus according to the present disclosure will be described with reference to the attached drawings. In the drawings, any line represented by a broken line indicates an electric connection.

FIG. 1 illustrates the first embodiment of the exhaust gas processing system including the desulfurization apparatus according to the present disclosure. An exhaust gas processing system 1 has a desulfurization apparatus 2 which removes a sulfur oxide from exhaust gas G, a denitration apparatus 3 arranged in a subsequent stage of the desulfurization apparatus 2 to remove a nitrogen oxide from exhaust gas G, and a carbon dioxide recovery apparatus 4 arranged in a subsequent stage of the desulfurization apparatus 2 and the denitration apparatus 3 to recover carbon dioxide from the exhaust gas G. Furthermore, the exhaust gas processing system 1 has a drying apparatus 5 which removes water content from the exhaust gas, and a mercury remover 6 which removes mercury from the exhaust gas, between the denitration apparatus 3 and the carbon dioxide recovery apparatus 4.

The desulfurization apparatus 2 is configured by a desulfurization unit 10 which removes a sulfur oxide from exhaust gas G with use of absorbing liquid A1, a removal unit 20 which removes gypsum (calcium sulfate) from the absorbing liquid A1 in which gypsum has been produced from sulfur oxide to precipitate, and a cleaning unit 21 which cleans the exhaust gas discharged from the desulfurization unit 10. The desulfurization unit 10 and the cleaning unit 21 are provided in a desulfurization column 7 so as to be disposed in series, and the exhaust gas G supplied from the bottom of the desulfurization column 7 sequentially passes through the desulfurization unit 10 and the cleaning unit 21 during the rise to the top. The desulfurization unit 10 is a compartment that performs a desulfurization processing according to the limestone-gypsum method, and it uses, as absorbing liquid A1, an aqueous dispersion liquid containing a calcium compound such as limestone and the like as an alkaline absorbent for absorbing the sulfur oxide. The desulfurization unit 10 has therein a spraying device which sprays the absorbing liquid A1 in the form of droplets in the exhaust gas G. Specifically, a spray nozzle 11 for spraying the absorbing liquid A1 is provided on the upper part of the inside of the desulfurization unit 10, and a circulating path 12 is provided in the outer side portion of the desulfurization column 7 to connect the bottom and the upper part of the desulfurization unit 10 with each other. Absorbing liquid A1 sprayed from the spray nozzle 11 and stored on the bottom of the desulfurization unit 10 is recirculated to the spray nozzle 11 by driving of a pump 13 on the circulating path 12, and the absorbing liquid A1 is repeatedly sprayed. Exhaust gas G is introduced from a gas inlet portion 14 below the spray nozzle 11, and a gas-liquid contact phase that brings the exhaust gas G into contact with absorbing liquid A1 is produced by the spray of absorbing liquid A1 between the spray nozzle 11 and the gas inlet portion 14. An analyzer S1 is provided in order to measure the nitrogen oxide concentration and the sulfur dioxide concentration in the exhaust gas G to be introduced into the desulfurization unit 10. By the contact between the exhaust gas G and the absorbing liquid A1, the sulfur oxides contained in the exhaust gas G are absorbed into the absorbing liquid A1 to produce their calcium salts. At this time, sulfur dioxide is dissolved as sulfite ions in the absorbing liquid A1. In the meantime, sulfur trioxide is absorbed into the absorbing liquid A1 and then makes gypsum (calcium sulfate) which is precipitated and dispersed. Hydrogen chloride and other acidic halides contained in the exhaust gas G are also absorbed into the absorbing liquid A1. Furthermore, an effect of washing and removing soot and dust is also obtained. The arrangement of the gas inlet portion 14 may be changed so as to blow the exhaust gas G into the absorbing liquid A1 stored in the bottom part. A water-cooling type cooler 15 is provided on the circulating path 12, and the absorbing liquid A1 in the desulfurization unit 10 is cooled through the cooler 15 while it is circulated in the circulating path 12, thereby increase of the liquid temperature is prevented. Furthermore, an inlet portion 71 is provided for supplying a fraction of post-recovery gas G' discharged from the carbon dioxide recovery apparatus 4 to the absorbing liquid A1 in the bottom part of the desulfurization unit 10, and a branch pipe 72 is connected to the inlet portion 71, wherein the pipe 72 is branched from a pipe 66 (details thereof will be described later) through which the post-recovery gas G' is discharged. Flow rate adjusting valves 73 and 74 for adjusting gas flow rate are fitted to the pipe 66 and the branch pipe 72, respectively, and the flow rate adjusting valves 73 and 74 function, by adjusting these opening, as an adjustment device for adjusting the distribution ratio of the fraction of post-recovery gas G' to be supplied to the desulfurization unit 10 in the post-recovery gas G' discharged from the carbon dioxide recovery apparatus 4. Oxygen contained in the post-recovery gas G' oxidizes sulfite ions dissolved in the absorbing liquid A1 to sulfate ions, which are deposited as calcium sulfate. The post-recovery gas G' from which oxygen has been consumed, being composed mainly of carbon dioxide, emerges out of the absorbing liquid A1 to be contained in the exhaust gas G from which the sulfur oxides have been removed.

The exhaust gas G is cooled by the sprayed absorbing liquid A1. If the introduced exhaust gas G is high in temperature, water in the sprayed absorbing liquid is vaporized by a rise in the temperature of the liquid, so that components contained in the absorbing liquid turn to fine solid particles (mist) and they are scattered and entrained in the exhaust gas G. The components of the scattered particles are calcium-containing solids such as limestone, gypsum, and calcium sulfite. In order to suppress these solid particles from being discharged to the outside with the entrainment in the exhaust gas G, a cleaning unit 21 is arranged above the spray nozzle 11, and the exhaust gas G passing through the gas-liquid contact phase to rise up passes through the cleaning unit 21 before discharged from the desulfurization column 7. The cleaning unit 21 has a pair of mist removal members 16a, 16b which are arranged upper and lower, and a cleaning nozzle 17 which is located between the mist removal members 16a, 16b. Each of the mist removal members 16a, 16b comprises a horizontal layer of a plurality of oblique plates arranged in parallel to each other with providing gaps between them. The multiple oblique plates are inclined with respect to the passage direction (the vertical direction) of the exhaust gas G, so that the solid particles contained in the exhaust gas G passing through the mist removal members are easy to collide with the oblique plates. When the mist removal members 16a, 16b are configured to have a height (the vertical direction) of about 150 to 250 mm and a gap (ventilation width) of about 50 to 100 mm between the oblique plates, this configuration is appropriate to remove the particles effectively from the exhaust gas G while suppressing the increase of the ventilation resistance of the exhaust gas. In order to remove the particles effectively, it is suitable that the inclined angle of the oblique plates (with respect to the vertical direction) is approximately from 20 to 45 degrees. If the colliding solid particles deposit onto the oblique plates, the gaps may be blocked. However, since the cleaning nozzle 17 splays the cleaning liquid towards both of up and down directions at all times, it also works to wash the mist removal members 16a, 16b, together with cleaning of the exhaust gas G. Since the cleaning liquid splayed from the cleaning nozzle 17 is the absorbing liquid from which the gypsum has been removed in the removal unit 20, its calcium content is less than that of the absorbing liquid A1 at the bottom of the desulfurization column 7 and it is suitable for washing (dissolving, capturing) of scattered particles. Moreover, since its temperature drops before reaching the cleaning nozzle 17, it is suitable for cooling of the exhaust gas G. Further, the cleaning liquid can also absorb acidic halides such as hydrogen chloride, residual sulfur oxide, nitrogen dioxide contained in the exhaust gas G. The cleaning liquid (absorbing liquid) after the washing flows down to the desulfurization unit 10 through the mist removal member 16a of the lower side, and it falls to the bottom of the column along with the absorbing liquid A1 supplied from the spray nozzle 11. Removal efficiency of the scattered particles is greatly improved by the combination of the mist removal members 16a, 16b and the spraying of the cleaning liquid. The mist removal member 16b at the upper side of the cleaning nozzle 17 further inhibits the micro droplets of the cleaning liquid or the like from being entrained in the exhaust gas G and discharged to the outside. The mist removal member 16b may be in a different form from the mist removal member 16a, and it may be configured with, for example, a net-like member, a porous thin plate or the like.

Top of the desulfurization column 7 is connected to a dust filter 29 by a pipe 18, and the exhaust gas G passing through the cleaning unit 21 is supplied to the dust filter 29 through the pipe 18. An analyzer S2 which measures sulfur dioxide concentration of the exhaust gas G is provided on the pipe 18. The dust filter 29 is provided for sufficiently removing, from the exhaust gas G, a trace amount of the scattered particles that have not removed by the cleaning unit 21 of the desulfurization column 7. In the dust filter 29, a spray nozzle 29s for cleaning is provided in order to eliminate the increase in ventilation resistance which progresses by clogging of the filter. Since the increase in the ventilation resistance of the dust filter 29 is considerably suppressed by providing the cleaning unit in the desulfurization column 7, the frequency of filter cleaning is reduced and it is possible to suppress the pressure loss. It is also possible to substantially omit the cleaning of the dust filter 29 by constituting the cleaning unit 21 in multiple stages.

In the desulfurization unit 10, sulfur dioxide absorbed from exhaust gas G is dissolved as a sulfite ion in the absorbing liquid A1, and then oxidized by oxygen contained in the post-recovery gas G' supplied from the branch pipe 72, thereby producing gypsum. In this regard, since the supply amount of the post-recovery gas G' is adjusted in accordance with the condition of the exhaust gas G discharged from the desulfurization apparatus 2 (details thereof will be described later), there may be a case where the supply amount of oxygen is insufficient. In order to cope with this matter, an oxidizing tank 30 is provided for sufficiently oxidizing sulfite ions. In the oxidizing tank 30, gypsum is sufficiently precipitated from the absorbing liquid A1' and the absorbing liquid A1' is supplied to the removal unit 20 to separate and remove the gypsum. Specifically, the absorbing liquid A1 flowing in the circulating path 12 is partially supplied through a branch path 31 into the oxidizing tank 30, and an on-off valve 32 to control the supply is provided on the branch path 31. The oxidizing tank 30 is provided with an inlet portion 33 to introduce an oxygen-containing gas such as air, thereby sulfurous acid in the absorbing liquid A1 is sufficiently oxidized to sulfuric acid. Moreover, in the oxidizing tank 30, a stirrer 34 is provided to stir the absorbing liquid and the oxidation reaction proceeds uniformly in the absorbing liquid by homogeneously mixing and stirring the absorbing liquid A1'. The air in which oxygen has been consumed, whose main component is nitrogen, is discharged from the oxidizing tank 30 to the outside. An analyzer S3 for measuring the liquid level is provided in the oxidizing tank 30, and the on-off valve 32 is electrically connected to the analyzer S3. Based on signal information from the analyzer S3, the flow rate of the absorbing liquid A1 to be supplied to the oxidizing tank 30 is adjusted in such a manner that the liquid amount in the oxidizing tank 30 is constant.

Calcium sulfate produced by the oxidation in the oxidizing tank 30 precipitates from absorbing liquid A1'. Accordingly, sulfites, sulfates and the like, that are produced from calcium ions eluting out from the absorbent and from the sulfur oxides absorbed from the exhaust gas G in the desulfurization unit 10, precipitate finally as gypsum (calcium sulfate) from the absorbing liquid A1'. By driving a pump 35, the absorbing liquid A1' in the oxidizing tank 30 is supplied through a pipe 36 to a cyclone separator 22 of the removal unit 20 and the gypsum is separated and recovered from the absorbing liquid A1' in the removal unit 20.

The removal unit 20 comprises the cyclone separator 22 which functions as a classification apparatus, and a vacuum belt filter 23 which functions as a filtration device. The cyclone separator 22 also functions as a concentrator of the gypsum. In the removal unit 20, concentration-classification of gypsum in the absorbing liquid A1' and filtration separation of the concentration-classified gypsum are carried out. Specifically, the cyclone separator 22 accelerates the separation according to specific gravity difference by the centrifugal force, thereby classifying the absorbing liquid A1' supplied from the oxidizing tank 30 and including the gypsum precipitate, into a first fraction that is concentrated and contains gypsum of relatively large particles, and a second fraction that is diluted and contains gypsum of relatively small particles. The first fraction containing the gypsum of the large particles is fed to the vacuum belt filter 23 through a pipe 25, and the gypsum is filtered off by filtration separation of the first fraction. Filtered gypsum is accommodated in a vessel V through a pipe 26. The absorbing liquid of the first fraction from which the gypsum has been removed is supplied as a cleaning liquid to the cleaning nozzle 17 of the cleaning unit 21 through a pipe 28 by driving of a pump 27. It captures the scattered particles in the exhaust gas G, and limestone contained therein is dissolved in the cleaning liquid.

In the cyclone separator 22, the absorbing liquid A1' is introduced under pressure into a swirl chamber of a conical shape, and separation of the gypsum from the absorbing liquid A1' according to the difference in specific gravity is facilitated by utilizing the centrifugal force, so that classification and concentration separation can be carried out continuously and efficiently. In particular, when using that of multi-cyclone system that a plurality of swirl chambers are provided in parallel to perform parallel processing, the time required for classifying and concentration of the gypsum is possibly shortened. In the meantime, the vacuum belt filter 23 is a filter for filtering a liquid product under reduced pressure. The first fraction of the absorbing liquid is supplied onto the circulating belt-like filter and the gypsum is deposited on the filter by filtration under reduced pressure. Since the deposited gypsum can be sequentially peeled off and recovered from the filter with use of a scraper or the like, separation by filtration can be performed continuously and efficiently. Because the first fraction to be supplied to the vacuum belt filter 23 is an absorbing liquid that the gypsum of relatively large particles has been concentrated, clogging is unlikely to occur in the filtration and the liquid easily goes out of the gypsum deposited on the filter. Therefore, working efficiency is good in recovery of the gypsum precipitated from the absorbing liquid. Accordingly, by combining the continuous filtration with the continuous classification and concentration as described above, it is possible to efficiently remove the gypsum from the absorbing liquid and continuously supply the absorbing liquid after the removal to the cleaning unit. Moreover, the second fraction containing the gypsum of relatively small particles is returned to the oxidizing tank 30 through a return path 24 but is not supplied to the vacuum belt filter 23. Therefore, it is possible to prevent fine particles of gypsum from remaining in the absorbing liquid after the filtration. Thus scattered particles are less likely to occur when it is supplied to the cleaning unit 21 as a cleaning liquid. Alternatively, the desulfurization apparatus 2 may be configured so that the return path 24 is changed to connect the cyclone separator 22 with the desulfurization column 7 and that the second fraction separated by the cyclone separator 22 is supply to the desulfurization unit 10 of the desulfurization column 7. Furthermore, the vacuum belt filter 23 may also be replaced with another means capable of continuous filtration, and continuous filtration is possible even by a plurality of filtering devices arranged in parallel and configured to be sequentially switched to use.

The absorbent in the absorbing liquid A1 is consumed as the desulfurization processing advances. Therefore, a tank 37 which accommodates slurry obtained by dispersing the absorbent (limestone) in a high content is additionally provided in the desulfurization apparatus 2 as a replenishing unit to replenish the absorbent, and the absorbent is replenished from the tank 37 to the desulfurization unit 10, The absorbent supplied to the desulfurization unit 10 is uniformly mixed into the absorbing liquid A1 by a stirrer 19 provided in the bottom part of the desulfurization unit 10. An analyzer S4 is set in the bottom part of the desulfurization column 7 to measure the pH of absorbing liquid A1 which has passed through the contact with the exhaust gas G, and it is electrically connected to an on-off valve 38 for adjusting the supply of absorbent from the tank 37 to the desulfurization column 7. The on-off valve 38 is controlled to replenish the absorbent of the tank 37 when the measured pH value of the absorbing liquid A1 by the analyzer 84 is lowered, so as to keep constant the pH of the absorbing liquid A1. Consequently, an appropriate amount of absorbent is replenished correspondingly to the amount of sulfur oxide which is introduced from the exhaust gas G to the absorbing liquid A1, and oversupply of the absorbent is thus prevented.

In a subsequent stage from the desulfurization apparatus 2, the denitration apparatus 3 is arranged to remove the nitrogen oxides from the exhaust gas G. The denitration apparatus 3 has a reaction unit 40 which advances an oxidation reaction to produce nitrogen dioxide from nitrogen monoxide, and a denitration unit 50 which removes nitrogen dioxide from the exhaust gas, using an aqueous absorbing liquid. Of the nitrogen oxides contained in the exhaust gas, nitrogen monoxide, which is water-insoluble, is converted to nitrogen dioxide to increase the denitration efficiency of the denitration unit 50. As the reaction unit 40, a means capable of pressurizing the exhaust gas may be utilized. Specifically, at least one compressor is used for compressing the exhaust gas G discharged from the desulfurization apparatus 2, and the reaction unit 40 in the exhaust gas processing system 1 in FIG. 1 is composed of a first compressor 41 and a second compressor 42. Through the first compressor 41 and the second compressor 42, the exhaust gas G discharged from the desulfurization apparatus 2 is pressurized stepwise so that oxygen and the nitrogen oxides contained in the exhaust gas G act to each other by the pressurization through the compressors, whereby a reaction of oxidizing nitrogen monoxide to nitrogen dioxide proceeds. Therefore, the nitrogen monoxide concentration in the pressurized exhaust gas G is decreased while the nitrogen dioxide concentration therein is raised. Moreover, if the sulfur oxides remain in the exhaust gas G, the oxidation of the sulfur oxides also advances. The temperature of the pressurized exhaust gas G becomes high. However, the denitration apparatus 3 in the present disclosure further has at least one cooler which cools the pressurized exhaust gas, and the exhaust gas G is cooled to an appropriate temperature. Specifically, a first cooler 43 and a second cooler 44 are located, respectively, in the stage subsequent to each of the first compressor 41 and the second compressor 42, so that compression and cooling are alternately repeated. The cooling of the first cooler 43 and the second cooler 44 may be either of a cooling system using a water cooling manner, or other cooling using a different coolant, and it is allowed to use any cooling device of a structure having a drain function of subjecting a condensate generated by the cooling to gas-liquid separation and of discharging the condensate. For example, ordinary coolers or heat exchangers may be connected to gas-liquid separators, and they may be used as the first cooler 43 and the and second cooler 44. When the pressurized exhaust gas G is cooled through the first cooler 43 and the second cooler 44, water vapor contained in the exhaust gas G condenses so that water is separated therefrom. Then the water-soluble components contained in the exhaust gas G are dissolved in the water. In other words, nitrogen dioxide in the exhaust gas shifts into the condensed water, and, when the sulfur oxides and the like remain therein, these are also dissolved in the condensed water, so that the nitrogen oxides and other water-soluble impurities in the exhaust gas G are lowered in concentration. Consequently, the condensed water generated by the cooling through the first cooler 43 and the second cooler 44 is separated and removed from the exhaust gas G, thereby recovering exhaust gas G in which the nitrogen oxides and other impurities have been decreased in concentration. In this way, the plural condensers and the plural coolers are alternately arranged to repeat compressing and cooling of the exhaust gas alternately, whereby the advance of the oxidation reaction and the dissolution/removal of the oxidation products are repeated to decrease the concentrations of the nitrogen oxides, the sulfur oxides and other water-soluble impurities in the exhaust gas G stepwise. An analyzer S5 is located in a subsequent stage from the reaction unit 40 to measure the nitrogen oxide concentration in the exhaust gas G.

In the exhaust gas processing system 1 in FIG. 1, in order to adjust the temperature of the exhaust gas G to a temperature suitable for the processing temperature in the denitration unit 50, a third cooler 45 having a drain function in the same manner as the first and second coolers 43, 44 have is provided in front of the denitration unit 50 so that the exhaust gas G is sufficiently cooled to an appropriate temperature. Since the cooling temperature in the third cooler 45 is lower than those in the first and second coolers 43 and 44, it is appropriate to use a cooler of the cooling manner that is capable of cooling to a lower temperature, and it may be a heat pump using a coolant, or the like.

It is noted that a cooler having no drain function is also usable for the first to third coolers 43 to 45. In this case, the condensed water is introduced to the denitration unit 50 together with the compressed exhaust gas G.

The denitration unit 50 in the exhaust gas processing system 1 in the present disclosure has a denitration column 8 which conducts a wet processing, and a substantially neutral or basic aqueous solution having a pH of about 5 to 9 is used as absorbing liquid A2. The absorbing liquid A2 contains an alkali metal compound such as sodium hydroxide and the like as a strongly alkaline absorbent which absorbs nitrogen oxide (nitrogen dioxide). The upper part of the inside of the denitration column 8 is provided with a spray nozzle 51 as a spray means for spraying the absorbing liquid A2 in the form of droplets into the exhaust gas G, and a circulating path 52 is provided at the outside of the column to connect the bottom part and the upper part thereof. The absorbing liquid A2 sprayed from the spray nozzle 51 and stored in the bottom part of the denitration column 8 is recirculated to the spray nozzle 51 by driving a pump 53 on the circulating path 52, so that the absorbing liquid A2 is repeatedly sprayed. Below the spray nozzle 51, a filling material 54 is loaded to produce a gas-liquid contact phase that brings the exhaust gas G into contact with absorbing liquid A2. By spraying the absorbing liquid A2 from the spray nozzle 51 and introducing the exhaust gas G from the bottom part of the denitration column 8, the exhaust gas G and the absorbing liquid A2 contact each other in gaps in the filling material 54 so that nitrogen dioxide contained in the exhaust gas G is absorbed into the absorbing liquid A2 to be dissolved therein as a nitrate. Moreover, the absorbing liquid A2 also absorbs the acidic halides such as hydrogen chloride and the remaining sulfur oxides that may be contained in the exhaust gas G. A water-cooling type cooler 55 is provided on the circulating path 52 so that the absorbing liquid A2 circulating in the circulating path 52 is cooled to prevent a rise in the temperature of the absorbing liquid A2 inside the denitration column 8. Thus the temperature is kept at an appropriate level.

In order to suppress the fine droplets and the like resulting from the absorbing liquid A2 from being entrained in the exhaust gas G to be discharged outside, a mist removal member 56 is arranged above the spray nozzle 51. The exhaust gas G passing through the filling material 54 to rise up passes through the mist removal member 56, and subsequently discharged through a pipe 57 from the denitration column 80. In the same manner as the mist removal member 16b of the desulfurization column 7, the mist removal member 56 may comprise a horizontal layer of a plurality of oblique plates arranged in parallel to each other to have gaps between them. Alternatively, it may be in any other form, and it may be configured, using, for example, a net-like member or a porous thin plate. As the denitration processing proceeds, the absorbent in the absorbing liquid A2 is consumed. Therefore, a tank 58 accommodating an aqueous solution in which the absorbent is contained in a high concentration is additionally provided. The absorbent in the tank 58 is appropriately replenished through the circulating path 52 to the denitration unit 50, The pH of the absorbing liquid A2 inside the denitration unit 50 is monitored by an analyzer S6 in the bottom part thereof.

The exhaust gas processing system 1 in the present disclosure has, in subsequent stages from the denitration apparatus 3, a drying apparatus 5 which removes water content from the exhaust gas, and a mercury remover 6 which removes mercury from the exhaust gas. Before the exhaust gas G discharged from the denitration unit 50 through the pipe 57 is supplied to the carbon dioxide recovery apparatus 4, water content and mercury are removed from it. An analyzer S7 is provided on the pipe 57 to measure the nitrogen oxide concentration in the exhaust gas.

The drying apparatus 5 is configured using a desiccant D which adsorbs moisture. The desiccant D is used in the state of being charged into a pair of columns 61a and 61b so as to repeat drying of the exhaust gas G and regeneration of the desiccant D alternately. Specifically, a terminal end of the pipe 57 is branched to be connected to each of the columns 61a and 61b, and a three-way switching valve 62a which controls the supply of the exhaust gas G to the columns 61a and 61b is fitted thereto. Exhaust gas G dried in the columns 61a and 61b is supplied through a pipe 63 and a three-way switching valve 62b into the mercury remover 6. Furthermore, a terminal end of a pipe 65 through which post-recovery gas G' discharged from the carbon dioxide recovery apparatus 4 is recirculated is branched to be connected to each of the columns 61a and 61b, and a three-way switching valve 64a which controls the gas supply to the columns 61a and 61b is fitted thereto. A pipe 66 and a three-way switching valve 64b are provided for discharging the post-recovery gas G' supplied to the columns 61a and 61b. By controlling the connection/switching of the three-way switching valves 62a, 62b, 64a and 64b, it is possible to supply the exhaust gas G to only one of the columns 61a and 61b while supplying the post-recovery gas G' to the other. Specifically, if the three-way switching valves 62a and 62b are communicated to the column 61a and the three-way switching valves 64a and 64b are communicated to the column 61b, the exhaust gas G is supplied through the pipe 57 to the column 61a while the post-recovery gas G' recirculated from the carbon dioxide recovery apparatus 4 is supplied through the pipe 65 to the column 61b. And, if the three-way switching valves are communicated respectively with the opposite side to the above-mentioned one, the respective supplies of the gases are reversed. The desiccant D can be suitably used by appropriately selecting one from the materials used generally as a drying agent, and examples thereof include a molecular sieve, silica gel and the like.

The mercury remover 6 can be configured by filling a column with a material capable of adsorbing the mercury as an adsorbent, and examples of the adsorbent include activated carbon and the like. Dried exhaust gas G discharged from the columns 61a and 61b is supplied through the pipe 63 to the mercury remover 6 to pass through the adsorbent, so that mercury is adsorbed and removed from the exhaust gas G.

The exhaust gas G that has passed through the desulfurization apparatus 2, the denitration apparatus 3, the drying apparatus 5 and the mercury remover 6, from which sulfur oxides, nitrogen oxides, water content and mercury have been removed, contains carbon dioxide in a high concentration, and the components contained therein as impurities are substantially oxygen, nitrogen and argon. This exhaust gas G is supplied to the carbon dioxide recovery apparatus 4 which has a heat exchanger for cooling a gas and a low-temperature distillation tower. Carbon dioxide can be liquefied when it is compressed at a pressure higher than or equal to the boiling line in the temperature range from the triple point to the critical point. Since the exhaust gas G to be supplied to the carbon dioxide recovery apparatus 4 has been pressurized, in the denitration apparatus 3, to a pressure at which liquefaction of carbon dioxide is possible, the carbon dioxide in exhaust gas G is liquefied when it is cooled to the boiling line temperature or lower in the heat exchanger of the carbon dioxide recovery apparatus 4. Since the liquefied carbon dioxide contains the impurities such as oxygen, etc., it is distilled at a distillation temperature of about −30° C. in the low-temperature distillation tower, and the impurities such as oxygen are discharged in the form of gas from the liquefied carbon dioxide. Accordingly, the post-recovery gas G' discharged through the pipe 65 from the carbon dioxide recovery apparatus 4 is a carbon dioxide gas having a higher proportion of oxygen and the other impurities than the exhaust gas G to be supplied to the carbon dioxide recovery apparatus 4. This post-recovery gas G' is recirculated to the columns 61a and 61b, and then used as a regenerating gas for drying the desiccant D. Purified liquefied carbon dioxide C is recovered from the carbon dioxide recovery apparatus 4.

The post-recovery gas G' discharged from the pipe 65 is heated to about 100° C. or higher through a heating device 67 in order to regenerate the desiccant D. The carbon dioxide recovery apparatus 4 makes use of a heat pump (refrigeration cycle) apparatus in order to supply a coolant for cooling to the heat exchanger. Since this heat pump apparatus emits exhaust heat and it can be used as a heat source for heating, such a configuration can be made that the exhaust heat is used in the heating device 67 to heat the post-recovery gas G' discharged through the pipe 65. The post-recovery gas G' heated for regeneration is recirculated to the columns 61a and 61b of the drying apparatus 5 through the pipe 65, and it is then supplied to the column of the side that no exhaust gas G is supplied, by controlling the three-way switching valves 62a, 62b, 64a and 64b as described above, so that the post-recovery gas G' heats the desiccant D and then water content is emitted from the desiccant D. In this way, post-recovery gas G' containing water vapor is discharged from the columns 61a and 61b. Since the desiccant D is heated on the regeneration, it is desired to cool the regenerated desiccant D before it is used for drying. For this purpose, it is advisable to stop the heating of the post-recovery gas G' by the exhaust heat when the regeneration of desiccant D is completed, and to supply unheated post-recovery gas G' to the desiccant D so as to cool it. Thereafter the three-way switching valves may be switched so as to alternate the column used for drying the exhaust gas G, of the columns.

Moreover, the branch pipe 72 which is branched from the pipe 66 and connected to the desulfurization unit 10 of the desulfurization column 7 is provided as an oxygen supply unit that supplies a fraction of the post-recovery gas G' discharged from the carbon dioxide recovery apparatus 4, as an oxygen source, to the absorbing liquid A1 in the desulfurization apparatus 2. The proportion of the post-recovery gas G' fraction supplied to the desulfurization apparatus 2 in the post-recovery gas G' discharged from the carbon dioxide recovery apparatus 4 is adjusted by flow rate adjusting valves 73 and 74. In order to make this adjustment based on the purity and the recovery ratio of liquefied carbon dioxide C, a monitor (not shown in the drawing) is provided to monitor the purity and the recovery ratio of the liquefied carbon dioxide C recovered by the carbon dioxide recovery apparatus 4 with use of an analyzer S8 which can measure carbon dioxide. The monitor is electrically connected to the flow rate adjusting valves 73 and 74. Since the post-recovery gas G' is carbon dioxide containing nitrogen and argon as impurities, if the proportion of the fraction supplied to the desulfurization unit 10 is excessive, the amount of these impurities contained in exhaust gas G becomes high so that the purity of liquefied carbon dioxide C is likely to decrease. Moreover, when the recovery ratio of liquefied carbon dioxide C is low, it is possible to increase carbon dioxide in exhaust gas G by increasing the distribution ratio of the post-recovery gas G' fraction to be supplied to the desulfurization unit 10, so as to raise the recovery ratio of liquefied carbon dioxide C. Accordingly, on the basis of signal data sent from the analyzer S8, the monitor controls the flow rate adjusting valves 73 and 74 so as to decrease the distribution ratio of the fraction of post-recovery gas G' to be supplied to the desulfurization unit 10 when the purity of the recovered carbon dioxide is lower than a target purity, or so as to increase the distribution ratio of the fraction of post-recovery gas G' to be supplied to the desulfurization unit 10 when the recovery ratio of recovered carbon dioxide is lower than a target recovery ratio. Furthermore, the monitor may be configured to monitor the sulfur dioxide concentration in the exhaust gas G discharged from the desulfurization apparatus 2, by means of the analyzer S2. Thus the distribution ratio of the fraction of post-recovery gas G' to be recirculated to the desulfurization unit 10 is raised when the sulfur dioxide concentration in the exhaust gas G discharged from the desulfurization apparatus 2 is higher than a target sulfur dioxide concentration. As a result, the carbon dioxide concentration in the exhaust gas G turns relatively high while the sulfur dioxide concentration therein turns relatively low.

In the construction of the above-mentioned exhaust gas processing system 1, the cleaning unit 21 of the desulfurization apparatus 2 can capture solid particles scattered from the desulfurization unit 10 according to the limestone-gypsum method without increasing the flow resistance of the exhaust gas G introduced from the combustion system, so that it is possible to favorably prevent wear, damage or the like in the subsequent first compressor 41. Thus, it is suitable for improving the system in durability. Further, use of the classifying function with the cyclone separator is profitable in order to utilize the absorbing liquid after removing the gypsum as the cleaning liquid in the cleaning unit 21. Moreover, the first and second compressors 41 and 42 allow the use of a wet-type denitration processing by advancing the oxidation reaction, so that it becomes unnecessary to use a reduction-type denitration processing in which ammonia or a catalyst, etc. is used. Additionally, the compressors not only function as the reaction unit 40 for causing the oxidation reaction to advance, but also act as a device for applying a pressure necessary for liquefying carbon dioxide. In short, the pressure necessary for liquefying carbon dioxide is used for constituting the denitration processing. A desulfurization processing according to the limestone-gypsum method and A wet-type denitration processing are profitable choices in terms of processing costs and the like. Accordingly, in order to achieve an economical exhaust gas processing system by combining these processes, the desulfurization apparatus in the present disclosure which prevents particles scatted on the subsequent devices to enable the integration of compressors to the system is useful.

Hereinafter, a description will be made about an embodiment of an exhaust gas processing method carried out in the exhaust gas processing system 1.

The exhaust gas processing method in the present disclosure comprises a desulfurization processing to remove a sulfur oxide from exhaust gas G according to the limestone-gypsum method; a denitration processing to remove a nitrogen oxide from exhaust gas G; and a carbon dioxide recovery processing to recover carbon dioxide from exhaust gas G. In addition, a drying processing and a mercury removal processing are conducted between the denitration processing and the carbon dioxide recovery processing. Thereby aluminum-made parts of a heat exchanger used for liquefying carbon dioxide are prevented from being damaged by mercury, so that liquefied carbon dioxide with high purity can be efficiently recovered. Furthermore, an oxygen supply processing is performed to supply a fraction of post-recovery gas G' discharged by the carbon dioxide recovery processing, as an oxygen source, to the desulfurization processing. The desulfurization processing has a desulfurization step of using the absorbing liquid to remove the sulfur oxides from the exhaust gas, a removal step of removing gypsum from the absorbing liquid which has precipitated the gypsum from the sulfur oxides by using a classification, and a cleaning step of removing calcium-containing particles contained in the exhaust gas that has undergone the desulfurization step, by using, as a cleaning liquid, the absorbing liquid from which gypsum has been removed in the removal step. The desulfurization step and the cleaning step are performed in the desulfurization unit 10 inside the desulfurization column 7 and the cleaning unit 21, respectively, and the removal step is performed in the removal unit 20 at the outside of the desulfurization column 7.

As the absorbing liquid A1, an aqueous dispersion liquid containing an absorbent is prepared and accommodated in the desulfurization unit 10. As the absorbent, calcium compounds such as limestone (calcium carbonate), quicklime (calcium oxide), slaked lime (calcium hydroxide) and the like are usable, and limestone is appropriately used from the viewpoint of costs. Since the calcium compound is not high in water-solubility, it is suitably pulverized in a powdery form and mixed into water to prepare in the form of dispersion liquid in which fine particles are dispersed, to use as the absorbing liquid A1. The desulfurization step is advanced by driving the pump 13 to spray the absorbing liquid A1 from the spray nozzle 11, and by introducing the exhaust gas G from the gas inlet portion 14 to bring them into gas-liquid contact with each other. In viewpoint of the efficiency of the gas-liquid contact, the absorbing liquid A1 is sprayed in the form of droplets having a suitable size, with use of the spray nozzle 11 that has a diameter of about 30 to 120 A. The absorbing liquid A1 sprayed from the spray nozzle 11 is cooled through the cooler 15 on the circulating path 12 to be prevented from being raised in liquid temperature. In order to gain a retention period during which the sulfur oxides in exhaust gas G are sufficiently absorbed into the absorbing liquid A1, the introducing speed of the exhaust gas G is appropriately adjusted in accordance with the sulfur oxide concentration in the exhaust gas G. The sulfur oxides contained in the exhaust gas G are absorbed into the absorbing liquid A1 to produce calcium salts. Sulfur dioxide is dissolved, as a sulfite ion, in the absorbing liquid A1 and sulfur trioxide forms calcium sulfate (gypsum) to precipitate, so that the disperse phase in the absorbing liquid A1 contain limestone and gypsum. Limestone is gradually dissolved in accordance with the precipitation of gypsum. Hydrogen chloride and other acidic halides contained in the exhaust gas G are also absorbed and dissolved in the absorbing liquid A1. Soot and dust are also captured therein.

The temperature of exhaust gas G supplied from combustion system generally becomes from about 100 to 200° C. When the exhaust gas G is introduced, the temperature thereof after gas-liquid contact in the desulfurization unit 10 becomes from about 50 to 100° C. For this reason, water content in the droplets of absorbing liquid A1 is vaporized, and solid components contained in the absorbing liquid turn into particles (mist) and scattered, so that the particles are entrained in the exhaust gas G. While passing through the mist removal members 16a, 16b in the cleaning unit 21, the solid particles collide easily with the oblique plates. Consequently, the particles are removable to some extent. Further, the particles are removed by sufficiently washing with the cleaning liquid (absorbing liquid after removing the gypsum) sprayed from the cleaning nozzle 17. In the exhaust gas processing system in FIG. 1 as mentioned above, the introduction temperature of the exhaust gas G is allowed to be up to about 200° C.

In the absorbing liquid A1 that has absorbed the sulfur oxides from the exhaust gas G in the desulfurization unit 10, calcium sulfite generated from sulfur dioxide is dissolved, but at least a part of it is oxidized by oxygen contained in the post-recovery gas G' supplied from the branch pipe 72, to be deposited as calcium sulfate. The post-recovery gas G' contains, as a main component, carbon dioxide, and post-recovery gas G' after oxygen has been consumed floats up in the absorbing liquid A1 to mainly supply carbon dioxide to the exhaust gas G from which the sulfur oxides have been removed.

Absorbing liquid A1 which has passed through the desulfurization step in the desulfurization unit 10 is partially supplied from the circulating path 12 through the branch path 31 to the oxidizing tank 30, and an oxygen-containing gas such as air is supplied in this stage. In this way, residual sulfurous acid in the absorbing liquid A1 is oxidized to sulfuric acid and precipitated as gypsum (calcium sulfate) from the absorbing liquid A1. Even if the supply of oxygen from the post-recovery gas G' is insufficient in the desulfurization unit 10, sufficient oxidization is performed in the oxidizing tank 30 so that the sulfur oxides in the exhaust gas G precipitate finally as gypsum from the absorbing liquid A1. It is sufficient for the gas to be supplied to the oxidizing tank 30 to be air or a like gas capable of supplying oxygen, and it is supplied in a quantity capable of oxidizing sulfurous acid sufficiently. The stirring speed of the stirrer 34 is adjusted to cause the oxidation reaction to advance uniformly in the absorbing liquid. Liquid level in the oxidizing tank 30 is kept constant by the analyzer S3 and the on-off valve 32.

Since the absorbent is consumed in accordance with the advance of the desulfurization processing, aqueous slurry in which the absorbent is dispersed in a high content is supplied from the tank 37 to the desulfurization unit 10 to replenish the absorbent, and it is mixed uniformly by the stirrer 19. It is advisable to adjust the concentration in the aqueous slurry to be supplied from the tank 37, considering the water content in the gypsum recovered from the desulfurization unit 10. Supply of absorbent from the tank 37 to the absorbing liquid A1 of the desulfurization unit 10 is controlled by the opening degree of the on-off valve 38 based on the measured pH value of the absorbing liquid A1 by the analyzer S4, and the pH of the absorbing liquid A1 is maintained in a certain range, suitably at approximately pH 4 to 7. Thus an appropriate amount of absorbent is replenished correspondingly to the amount of sulfur oxides introduced from the exhaust gas G, and oversupply of the absorbent to the absorbing liquid A1 can be prevented.

By driving the pump 35, the absorbing liquid A1' which has passed through the oxidation in the oxidizing tank 30 is subjected to concentration separation and filtration separation at the removal step in the cyclone separator 22 and the vacuum belt filter 23 of the removal unit 20 so that gypsum is removed from the absorbing liquid A1'. The cyclone separator 22 classifies the absorbing liquid A1' into a first fraction concentrated and containing gypsum of relatively large particles and a second fraction diluted and containing gypsum of relatively small particles. By introducing the absorbing liquid A1' into the cyclone separator 22 with applying pressure of about 0.1 to 0.5 MPa, the absorbing liquid A1' is suitably classified. The first fraction of the classified absorbing liquid A1' is supplied to the vacuum belt filter 23, and the gypsum is filtered off and accommodated in the vessel V. Considering the mesh size, etc. of the belt-shaped filter in general vacuum belt filter 23, the separation in the cyclone separator 22 is adjusted so that the particle size of gypsum contained in the first fraction is about 50 μm or more, suitably about 20 μm or more, so that gypsum can be separated with a suitable filtration efficiency in the vacuum belt filter 23. Also, pressure reduction is not excessively required and the filtration can be carried out satisfactorily, in general, at about 10 kPa. The second fraction of the absorbing liquid A1' is recirculated from the cyclone separator 22 to the oxidizing tank 30 and it is mixed with the absorbing liquid A1 that flows newly therein. The absorbing liquid obtained by removing gypsum from the first fraction in the vacuum belt filter 23 is supplied as the cleaning liquid to the cleaning nozzle 18 of the cleaning unit 21 by driving the pump 27, and it captures the scattered particles in the exhaust gas G.

Exhaust gas G that has undergone the desulfurization step to rise from the desulfurization unit 10 is subjected to a cleaning step using the absorbing liquid supplied from the removal unit 20 to the cleaning nozzle 17 as the cleaning liquid. In this way, the scattered particles which cannot be removed by the mist removal members 16a, 16b are sufficiently removed from the exhaust gas G. At this time, soot and dust, and hydrogen chloride contained in the exhaust gas G are also washed and removed. The temperature of exhaust gas G after introduced to the cleaning unit 21 is lowered to about 40 to 80° C. by the cleaning. The cleaning liquid has been decreased in the concentrations of sulfur oxide-derived components and calcium and it is suitable also for use as washing water for the mist removal members 16a, 16b. By the washing of the mist removal members 16a, 16b, particles of limestone and gypsum absorb the water to fall down, which drop to the bottom part of the desulfurization unit 10 along with the absorbing liquid A1 sprayed from the spray nozzle 11, while absorbing the sulfur oxides from the exhaust gas G.

If a very small amount of scattered particles remain in the exhaust gas G discharged from the top of the desulfurization column 7 after passing through the cleaning step, the scattered particles are sufficiently removed by passing of the exhaust gas G through the dust filter 29. As necessity arises, a filter in the dust filter 29 is appropriately cleaned using a spray nozzle 29s for washing, thereby clogging is prevented and the pressure loss of the gas flow is suppressed.

The exhaust gas G that has undergone the desulfurization processing is subjected to a reaction step, a cooling step and a denitration step for a denitration processing. Initially, in the reaction step, the exhaust gas is compressed at about 1.0 to 2.0 MPa by the first compressor 41. By the compression heat, the temperature is raised to about 100 to 200° C., generally about 150° C. By the pressure increase, an oxidation reaction advances in the exhaust gas G, so that nitrogen dioxide is produced from nitrogen monoxide and the oxygen content is decreased. Although sulfur oxides of the exhaust gas G have been substantially removed by the desulfurization processing, if remaining, the oxidation reaction advances also in the remaining sulfur dioxides so that sulfur trioxide is produced from sulfur dioxide. Moreover, mercury is also oxidized to $Hg^{2+}$ to become easily dissolved in water. In the cooling step, the exhaust gas G compressed is cooled by the first cooler 43, so that water vapor contained in the exhaust gas G is condensed. When the cooling is of a water-cooling type, the exhaust gas G is generally cooled to about 40° C. As a result, nitrogen dioxide, sulfur oxides and mercury each contained in the exhaust gas G are dissolved in the condensed water, so that the amount of them contained in the exhaust gas is decreased. The condensed water is separated from the exhaust gas G and discharged through a drain. Furthermore, the exhaust gas G is supplied to the second compressor 42, so that the reaction step is repeated. At this time, it is compressed at a pressure at which liquefaction of the carbon dioxide is possible. Specifically, the exhaust gas G is compressed to about 2.0 to 4.0 MPa, and the temperature is again raised to about 100 to 200° C. By the pressure increase, an oxidation reaction again advances, so that nitrogen dioxide is produced from the remaining nitrogen monoxide and the oxygen content is further decreased. If remaining, an oxidation reaction advances also in the remaining sulfur oxides, so that sulfur trioxide is produced from sulfur dioxide. The oxidation of mercury also advances in the same way. The exhaust gas G compressed in the second compressor 42 is again cooled in the second cooler 44, in a cooling step, so that water vapor contained in the exhaust gas G is condensed. When the cooling is of a water-cooling type, the exhaust gas G is generally cooled to about 40° C. Nitrogen dioxide, sulfur oxides and mercury each contained in the exhaust gas G are dissolved in the condensed water, and the amount of them contained in the exhaust gas is further decreased. The condensed water is separated from the exhaust gas G to be discharged through a drain. The exhaust gas G cooled by the second cooler 44 is further cooled through the third cooler 45 to be adjusted to a temperature of about 0 to 10° C., that is suitable as a processing temperature in the denitration column 8. The condensed water is discharged through the drain in the same way. As a result, the quantity of the impurities (nitrogen dioxide, sulfur oxides and $Hg^{2+}$) that the condensed water generated in the coolers dissolves is removed from the exhaust gas G.

The exhaust gas G that has passed through the third cooler 45 is supplied to the denitration unit 50 so that the denitration step is carried out. Specifically, spraying the absorbing liquid A2 from the spray nozzle 51 by driving the pump 53, the exhaust gas G rising in the filling material 54 from the bottom part of the denitration column 8 is brought into gas-liquid contact with the absorbing liquid A2. Nitrogen dioxide contained in the exhaust gas G is absorbed into the absorbing liquid A2 to be dissolved as a nitrate salt. The acidic halides such as hydrogen chloride and the remaining sulfur oxides that are each contained in exhaust gas G are also absorbed into the absorbing liquid A2. As the absorbing liquid A2, a substantially neutral or basic aqueous liquid containing an absorbent for absorbing nitrogen oxide may be used. The absorbing liquid A2 in use is adjusted to have a pH of about 5 to 9. The absorbent may be an alkali metal compound to use, and is suitably a strongly basic alkali metal hydroxide such as sodium hydroxide, potassium hydroxide and the like. It is appropriate for use to prepare an aqueous solution that the absorbent is dissolved in water. By the cooler 55, the absorbing liquid A2 to be sprayed is prevented from rising in temperature. As the denitration processing advances, the absorbent is appropriately supplied from the tank 58 to replenish the consumed absorbent.

Exhaust gas G which has passed through the denitration step is subjected to a drying processing in the drying apparatus 5. Specifically, the exhaust gas G is supplied to one of the columns 61*a* and 61*b*, and then water content is removed therefrom by the desiccant D. During this period, in the other column, desiccant D is regenerated by the gas for regeneration that is supplied from the carbon dioxide recovery apparatus 4. Since the capability of processing the exhaust gas G is possibly set, in advance, based on the moisture absorption capacity of the desiccant D contained in the column, the three-way switching valves 62*a*, 62*b* are switched to change the column to be supplied with the exhaust gas G into the other column, before the supply quantity of the exhaust gas G reaches the maximum amount that is possibly processed. At the same time, the three-way switching valves 64*a*, 64*b* are switched also to change the column in which the desiccant D is regenerated into the other column. The switching may be made at intervals of a predetermined processing period. The desiccant D to be used may be appropriately selected from the materials usable ordinarily as a drying agent. Examples of the desiccant D includes materials which are capable of physically or chemically absorbing or adsorbing the moisture, such as a molecular sieve, silica gel, alumina, zeolite and the like. The post-recovery gas G' for regeneration that is supplied from the carbon dioxide recovery apparatus 4 is dried carbon dioxide which is high in concentrations of oxygen, nitrogen and argon. The post-recovery gas is heated to a temperature suitable for the regeneration, suitably to about 100° C. or higher and then supplied so that water content is released from the desiccant D, to regenerate the desiccant D. Before switching to the drying from the regeneration, it is desirable to stop heating of the post-recovery gas G' for regeneration, in order to cool the column to a column temperature suitable for the drying processing.

The dried exhaust gas G discharged from the columns 61*a*, 61*b* is supplied to the mercury remover 6, and thus removal of mercury is carried out by adsorption with an adsorbent. Examples of the adsorbent in the mercury remover 6 include activated carbon, activated carbon carrying potassium iodide, ion exchange resin, etc. Since the sulfur oxides, the nitrogen oxides, water and mercury have been removed from the exhaust gas G which has passed through the mercury remover 6, the exhaust gas G contains carbon dioxide in a very high concentration, and components contained therein as impurities are substantially oxygen, nitrogen and argon.

The temperature of the exhaust gas G in the denitration apparatus 3, the drying apparatus 5 and the mercury remover 6 depends substantially on the temperature in the denitration unit 50, and the pressure of exhaust gas G depends on the compression degree in the second compressor 42. On the compression in the second compressor 42, exhaust gas G is pressurized and compressed to a pressure at which liquefaction of carbon dioxide is possible, that is, about 2.0 to 4.0 MPa, and exhaust gas G in which this pressure is maintained is supplied to the carbon dioxide recovery apparatus 4. This exhaust gas G, in the carbon dioxide recovery apparatus, is cooled to the boiling line temperature or lower, suitably about −20 to −50° C. with the heat exchanger, and carbon dioxide in the exhaust gas G is liquefied. The liquefied carbon dioxide is distilled at a temperature of about −20 to −50° C. in the low-temperature distillation tower so that oxygen, nitrogen, argon and other impurities are removed from the liquefied carbon dioxide. A carbon dioxide gas in which the proportion of these impurities has been increased is discharged from the low-temperature distillation tower as a post-recovery gas G'. The post-recovery gas G' is heated to 100° C. or higher, suitably about 100 to 200° C., and subsequently recirculated to the desiccant D in the columns 61*a*, 61*b* through the pipe 65, so as to be used as a gas for regeneration. By regenerating the desiccant D, the post-recovery gas G' which contains water vapor is discharged from the columns 61*a*, 61*b*. The liquefied carbon dioxide C that is generally purified to a purity of about 95 to 99% is recovered from the carbon dioxide recovery apparatus.

Post-recovery gas G' discharged from the carbon dioxide recovery apparatus 4, which is carbon dioxide containing approximately several tens of percent of impurities (oxygen, nitrogen and argon), is used for regenerating the desiccant D, and its fraction is subsequently supplied as an oxygen source to the absorbing liquid A1 which has passed through the desulfurization step. The proportion of the fraction of post-recovery gas G' to be supplied to the absorbing liquid A1 in the desulfurization unit 10 is adjusted through the flow rate adjusting valves 73, 74. For the adjustment, a target recovery ratio and a target purity of liquefied carbon dioxide C are set in advance, and the recovery ratio and the purity of the liquefied carbon dioxide C which are monitored by the analyzer S8 are compared with the target recovery ratio and the target purity, respectively. Then the flow rate adjusting valves 73, 74 are controlled in such a manner that, if the purity of the recovered carbon dioxide is lower than the target purity, the proportion of the fraction of post-recovery gas G' to be supplied to the absorbing liquid A1 in the desulfurization unit 10 is decreased, or that, if the recovery ratio of the recovered carbon dioxide is lower than the target recovery ratio, the proportion of the fraction of post-recovery gas G' to be supplied to the absorbing liquid A1 in the desulfurization unit 10 is increased. If both of the purity and the recovery ratio of the recovered carbon dioxide are lower than the respective target values, it is necessary to make a change to lower at least one of the set target values. If the proportion of the fraction of post-recovery gas G' to be supplied to the desulfurization unit 10 is increased, carbon dioxide in the exhaust gas G increases, so that the recovery ratio of the liquefied carbon dioxide C can be raised. If the proportion of the fraction to be supplied to the desulfurization unit 10 is decreased, the content of the impurities (nitrogen and argon) contained in the exhaust gas G decreases, so that it becomes easy to increase the purity of the liquefied carbon dioxide C. Here, such a modification is also possible that the proportion of the fraction of post-recovery gas G' to be supplied to the desulfurization unit 10 is adjusted, based on only one of the purity and the recovery ratio of liquefied carbon dioxide C.

A specific example of a procedure for determining the proportion X of the fraction of post-recovery gas G' to be supplied to the desulfurization unit 10 will be described below.

Initially, the target purity of liquefied carbon dioxide C is set, and only the flow rate adjusting value 73 is opened so that the proportion X of the fraction of post-recovery gas G' to be supplied to the desulfurization unit 10 is zero, and then an exhaust gas processing is performed while the recovery ratio and the purity of the liquefied carbon dioxide C are monitored. It is checked whether or not the purity of the liquefied carbon dioxide C reaches the target value or more, and, if the purity does not reach the target value, the purifying accuracy of the carbon dioxide recovery apparatus 4 is adjusted so that the purity-increases to the target purity or higher. A value higher than the recovery ratio obtained at this time is set to the target recovery ratio, and the flow rate adjusting value 74 is opened so as to make the variation of the proportion X into ΔX. In this state, the recovery ratio and the purity of the liquefied carbon dioxide C are monitored. As far as the purity maintains the target purity or higher, the adjustment of the flow rate adjusting valves 73, 74 can be repeated to increase the proportion X by ΔX per once until the recovery ratio reaches the target recovery ratio. And the increasing of the proportion X is stopped when the purity becomes the target purity or lower. If the purity is lower than the target purity, the proportion X is decreased. In such a manner, it is possible, in the case of recovering the liquefied carbon dioxide C with the target purity, to increase the recovery efficiency up to the upper limit.

Moreover, adjustment of the proportion x to decrease the sulfur dioxide concentration of the exhaust gas G after the desulfurization processing, by using the post-recovery gas G' mentioned above, is performed as follows.

The sulfur dioxide concentration in the exhaust gas G discharged from the desulfurization apparatus 2 is monitored by means of the analyzer S2, which compares the sulfur dioxide concentration in the exhaust gas G with a target sulfur dioxide concentration. If the sulfur dioxide concentration in the exhaust gas G discharged from the desulfurization apparatus 2 is higher than the target sulfur dioxide concentration, the proportion X of the fraction of post-recovery gas G' to be recirculated to the desulfurization unit 10 is increased, thereby the carbon dioxide concentration in the exhaust gas G increases and the sulfur dioxide concentration therein decreases.

This adjustment of the proportion X can be made concurrently with the above-mentioned adjustment based on the purity and the recovery ratio of the liquefied carbon dioxide C. However, by adjusting the proportion X of the post-recovery gas G' to decrease the sulfur dioxide concentration in the exhaust gas G, the purity of liquefied carbon dioxide C is lowered. Thus, if both of them are not satisfied, processing conditions in the desulfurization apparatus 2 are reconsidered in order to increase the desulfurization efficiency.

By supplying a fraction of the post-recovery gas G' into the desulfurization unit 10 in this way, oxygen is consumed for the processing of the exhaust gas, so that the oxygen concentration in the exhaust gas G to be supplied to the carbon dioxide recovery apparatus 4 is relatively decreased while the carbon dioxide concentration therein is relatively increased. Therefore, an improvement can be made in the purity and the recovery ratio of the liquefied carbon dioxide C on the condition that the impurity content (nitrogen and argon) is not excessively concentrated in the exhaust gas G.

In the exhaust gas processing system 1, the first cooler 43 may be omitted. However, by the removal of condensed water by performing a cooling every time after compression as illustrated in FIG. 1, the water vapor content in the exhaust gas is reduced and load is decreased in the compressors positioned behind. Although the reaction unit 40 in the exhaust gas processing system 1 is composed of the two compressors, the reaction unit 40 may be configured with a single compressor, or three or more compressors. When the number of compressors constituting the reaction unit 40 is increased, the compression quantity for raising the exhaust gas pressure to a pressure necessary for liquefying carbon dioxide is dispersed into the individual compressors, so that the load applied to each of the compressors is decreased. Unless the pressure of exhaust gas G that has passed through the reaction unit 40 rises to the pressure at which liquefaction of carbon dioxide is possible, the configuration is necessarily modified to pressurize the exhaust gas G in the carbon dioxide recovery apparatus 4 or in the preceding stage thereof. For example, a compressor and a cooler are additionally provided in front of the carbon dioxide recovery apparatus 4.

Moreover, it is also possible to modify the desulfurization apparatus 2 of the exhaust gas processing system 1 so as to omit the oxidizing tank 30. In this case, it is appropriate that the oxygen source (air) which is supplied to the oxidizing tank 30 is modified so as to be supplied to the absorbing liquid A1 stored in the desulfurization unit 10 of the desulfurization column 7, that the absorbing liquid A1 flowing through the branch path 31 is modified so as to be supplied direct to the cyclone separator 22, and that the second fraction (including gypsum of relatively small particles) of the absorbing liquid classified in the cyclone separator 22 is recirculated to the desulfurization unit 10.

The exhaust gas processing system 1 illustrated in FIG. 1 is an embodiment configured to manage the introduction of exhaust gas G that is high in temperature. If the temperature of exhaust gas G is as low as a temperature lower than 100° C., a modification can be made to improve the processing efficiency on the basis of the managing capability thereof. Such an embodiment is illustrated in FIG. 2.

Figure 2:
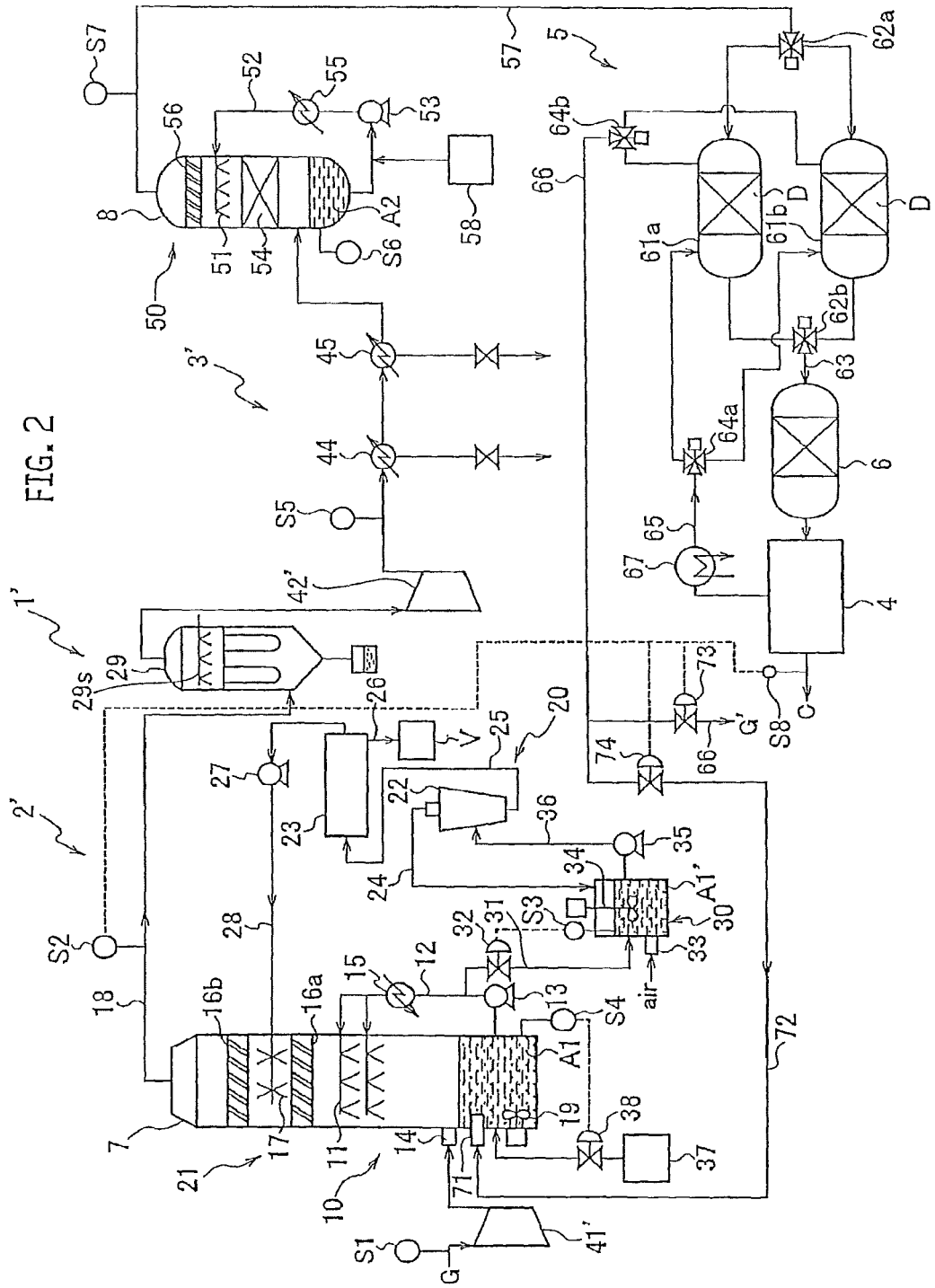
FIG. 2 is a schematic structural view illustrating another embodiment of the exhaust gas processing system including the desulfurization apparatus according to the present disclosure.

Each part of an exhaust gas processing system 1' illustrated in FIG. 2 is configured by using the same components as the exhaust gas processing system 1 of FIG. 1. However, this system is different in that the arrangement of the first compressor 41 is changed and the first cooler 43 is omitted. Specifically, in the exhaust gas processing system 1', the reaction unit 40 in FIG. 1 is divided into first and second reaction units, and a first compressor 41' constituting the first reaction unit is arranged in front of a desulfurization unit 10 in a desulfurization apparatus 2'. The second reaction unit is made only of a second compressor 42' in a denitration apparatus 3' located in a subsequent stage from the desulfurization apparatus 2'. Accordingly, in each of the desulfurization apparatus 2' and the denitration apparatus 3', an oxidation reaction is advanced by pressurization in the exhaust gas G that has not yet been processed.

Specifically, when exhaust gas G is supplied to the processing system 1', the exhaust gas G is initially pressurized to about 1.0 to 2.0 MPa in the first compressor 41', so that its temperature is raised into the range of about 100 to 200° C. by the compression heat. By the pressure increase, an oxidation reaction advances in the exhaust gas G to produce sulfur trioxide from sulfur dioxide. Moreover, nitrogen dioxide is produced from nitrogen monoxide, and mercury is also oxidized to $Hg^{2+}$ and becomes easy to be dissolved in water, so that the oxygen content therein is decreased. Since the temperature of the compressed exhaust gas G meets the initial temperature condition of exhaust gas G supplied to the exhaust gas processing system 1 in FIG. 1, a desulfurization processing can be favorably performed by the desulfurization unit 10 and a cleaning unit 21. The temperature of exhaust gas G that has been brought into gas-liquid contact with absorbing liquid A1 in the desulfurization unit 10 becomes about 40 to 80° C. in the same way as in the case illustrated in FIG. 1. The spray of the absorbing liquid in the desulfurization unit 10 also fulfils a role of the first cooler 43 in FIG. 1. Particles scattered from the absorbing liquid A1 are removed by the cleaning with the cleaning liquid while passing through mist removal members 16a, 16b in the cleaning unit 21. At the same time, it is cooled to about 40 to 80° C.

In regard to the components absorbed into absorbing liquid A1 in the desulfurization unit 10, sulfur dioxide is decreased while sulfur trioxide is increased, in comparison with those in the embodiment in FIG. 1. Therefore, the amount of oxygen supplied to the oxidizing tank 30 required for the oxidation of sulfite ions and the supply amount of the post-recovery gas G' to the desulfurization unit 10 are reduced. Furthermore, the quantity of nitrogen dioxide and $Hg^{2+}$ absorbed into absorbing liquid A1 also increases. Consequently, the contents of nitrogen monoxide and mercury in the exhaust gas G discharged from the cleaning unit 21 of the desulfurization apparatus 2' become smaller than those in the case of FIG. 1.

Exhaust gas G discharged from the cleaning unit 21 is supplied to the second compressor 42'. In the same way as in the second compressor 42 in FIG. 1, the exhaust gas G therein is then compressed to a pressure at which liquefaction of carbon dioxide is possible, and its temperature is raised. By the pressure increase, an oxidation reaction advances again, and nitrogen dioxide is thus produced from the remaining nitrogen monoxide so that the oxygen content is further decreased. In the case where sulfur oxides are remaining, an oxidation reaction proceeds also in the sulfur oxides so that sulfur trioxide is produced from sulfur dioxide. The oxidation of mercury also advances. The exhaust gas G compressed in the second compressor 42 is cooled in a second cooler 44 so that water vapor contained in the exhaust gas G is condensed. Nitrogen dioxide, sulfur oxides, and mercury each contained in the exhaust gas G are dissolved in the condensed water so that these contents contained in the exhaust gas G are further decreased. The condensed water is separated from the exhaust gas G to be discharged through a drain.

Thereafter, the exhaust gas G cooled through the second cooler 44 is subjected to cooling through a third cooler 45, a denitration processing in a denitration unit 50, a drying processing in a drying apparatus 5, and mercury adsorption/removal in a mercury remover 6. These are the same as in the exhaust gas processing system 1 in FIG. 1. Moreover, the exhaust gas processing system 1' is same as the exhaust gas processing system 1 in FIG. 1 also in regard to a configuration of distributing and supplying to the desulfurization unit 10 a fraction of the post-recovery gas G' discharged from the carbon dioxide recovery apparatus 4, and an operation of controlling the supply. Therefore, description on these configurations and operations is omitted.

When the compressor is arranged in front of the desulfurization unit 10 as in the exhaust gas processing system 1' in FIG. 2, the consumed oxygen quantity in exhaust gas G is increased by the oxidation reaction due to the pressure increase. Accordingly, the oxygen content in the exhaust gas to be supplied to the carbon dioxide recovery apparatus 4 becomes smaller than that in the case of the exhaust gas processing system 1 in FIG. 1. Moreover, since the components (nitrogen dioxide and $Hg^{2+}$) that are solubilized in water by oxidation have the increased opportunity to come into contact with the aqueous liquid, the exhaust gas processing system 1' is profitable for an improvement in the removal efficiency of these components and the use lifespan of the mercury adsorbent. In the exhaust gas processing system 1' in FIG. 2, the second reactor of the denitration apparatus 3' may be composed of plural compressors, and this form is equal to an embodiment in which a compressor is added to the front stage of the desulfurization apparatus 2 of the exhaust gas processing system 1 in FIG. 1. If the number of the compressors is increased, it is advisable to set the compression ratio of each of the compressors so as to render the pressure of the exhaust gas G discharged from the final one of the compressors a pressure at which liquefaction of carbon dioxide is possible.

As understood from the above description of the embodiments, installation conditions, etc. of the apparatus and system are not excessively restricted, and it is possible to perform the desulfurization and the denitration of an exhaust gas efficiently without increasing of the processing cost. Therefore, it is possible to provide a desulfurization apparatus that installation conditions and installation environment are not restricted, that operating costs can be decreased, and that maintenance and management are easy, and an exhaust gas processing system using the same. Moreover, efficient recovery of high purity carbon dioxide is possible with use of the configuration of the desulfurization processing according to the limestone-gypsum method, and it is profitable in development of the use of the recovered carbon dioxide. Accordingly, it contributes to installation of the processing system and spread of the processing method, for an exhaust gas containing carbon dioxide such as oxygen combustion gas and the like, and it is therefore useful in responding to environmental issues. Since it can be carried out easily by using ordinary facilities without requiring special equipment or expensive device, it is economically profitable.

In the present disclosure, carbon dioxide with a high purity can be efficiently recovered by utilizing the desulfurization according to the limestone-gypsum method in a processing of an exhaust gas discharged from thermal power stations, ironworks, boilers and other facilities, and economic efficiency is improved in the use of the exhaust gas processing to the provision of liquefied carbon dioxide. The disclosed technology can be used for a processing of a carbon-dioxide-containing gas or others, and it is thus useful for decreasing the amount of discharged carbon dioxide and its impact on the environment, etc. While the durability of an apparatus therefor is ensured, costs for the processing can be decreased. Thus the disclosed technology can provide an exhaust gas processing system that can attain a system management without trouble, and can contribute to environmental protection.

As there are many apparently widely different embodiments of the disclosure that may be made without departing from the spirit and scope thereof, it is to be understood that the disclosure is not limited to the specific embodiments thereof, except as defined in the appended claims.

What is claimed is:

1. An exhaust gas processing system, comprising:
  a desulfurization apparatus that removes a sulfur oxide from an exhaust gas according to limestone-gypsum method; and
  a denitration apparatus arranged in a subsequent stage from the desulfurization apparatus and having a compressor which compresses the exhaust gas discharged from the desulfurization apparatus and a denitration unit containing an aqueous absorbing liquid and arranged in a subsequent stage from the compressor, to remove a nitrogen oxide from the exhaust gas, wherein pressurization of the exhaust gas by the compressor advances oxidation reaction of nitrogen monoxide to nitrogen dioxide and the aqueous absorbing liquid absorbs nitrogen dioxide and separates from the exhaust gas, the desulfurization apparatus comprising:

a desulfurization unit that brings an absorbing liquid containing a calcium compound into contact with the exhaust gas to remove the sulfur oxide from the exhaust gas;

a removal unit that removes gypsum produced from the calcium compound and the sulfur oxide, from the absorbing liquid by classification and filtration;

an oxidizing tank between the desulfurization unit and the removal unit, the oxidizing tank supplying an oxygen source to the absorbing liquid which has passed through the contact with the exhaust gas in the desulfurization unit, to oxidize sulfurous acid and precipitate gypsum;

a cleaning unit that cleans the exhaust gas having passed through the contact with the absorbing liquid in the desulfurization unit, with use as a cleaning liquid of the absorbing liquid from which the gypsum is removed by the removal unit, to remove calcium-containing particles contained in the exhaust gas; and a dust filter arranged in a subsequent stage from the cleaning unit, wherein the cleaning unit has a mist removal member constituted by a plurality of oblique plates arranged in parallel with gaps provided therebetween and inclined with respect to a passage direction of the exhaust gas, wherein the removal unit has a cyclone separator to classify the gypsum, and a filter for filtering off the gypsum from the absorbing liquid, and wherein the absorbing liquid that has been subjected to the oxidation at the oxidizing tank is supplied to the removal unit and the cyclone separator classifies the absorbing liquid having the produced gypsum into a first fraction containing the gypsum of relatively large particles and a second fraction containing the gypsum of relatively small particles, and the filter filters off the gypsum from the first fraction to supply the filtered absorbing liquid to the cleaning unit and the second fraction classified by the cyclone separator returns to the oxidizing tank.

2. The exhaust gas processing system as set forth in claim 1, wherein the cleaning unit has a pair of the mist removal members arranged so that the exhaust gas which has passed through the desulfurization unit sequentially passes therethrough, and a cleaning nozzle which supplies the cleaning liquid to the exhaust gas between the pair of the mist removal members.

3. The exhaust gas processing system as set forth in claim 1, wherein the desulfurization apparatus further comprises:

an analyzer which measures pH of the absorbing liquid which has passed through the contact with the exhaust gas in the desulfurization unit; and a replenishing unit which replenishes the calcium compound to the absorbing liquid in the desulfurization unit in accordance with the measurement of the analyzer.

4. The exhaust gas processing system as set forth in claim 1, wherein the filter includes a belt filter which filters the absorbing liquid under reduced pressure.

5. The exhaust gas processing system as set forth in claim 1, wherein the oxidizing tank supplies air to the absorbing liquid which has passed through the contact with the exhaust gas in the desulfurization unit, to perform oxidation.

6. The exhaust gas processing system as set forth in claim 1, further comprising:

a carbon dioxide recovery apparatus arranged in a subsequent stage from the denitration unit, to recover carbon dioxide from the exhaust gas; and an oxygen supply unit that supplies a fraction of a post-recovery gas discharged from the carbon dioxide recovery apparatus, as an oxygen source, to the desulfurization apparatus.

7. The exhaust gas processing system as set forth in claim 6, wherein the carbon dioxide recovery apparatus includes: a heat exchanger for cooling the exhaust gas to the boiling line temperature of carbon dioxide or lower; and a low-temperature distillation tower for distilling carbon dioxide liquefied from pressurized and cooled exhaust gas.

8. The exhaust gas processing system as set forth in claim 1, wherein the dust filter includes a spray nozzle for filter cleaning.

* * * * *